(12) United States Patent
Neufeld et al.

(10) Patent No.: US 8,292,065 B1
(45) Date of Patent: Oct. 23, 2012

(54) CROSS CLEATED CONVEYOR BELT FOR A TUBULAR CONVEYOR

(75) Inventors: Juan Neufeld, Winkler (CA); Bernie Thiessen, Winkler (CA)

(73) Assignee: Meridian Manufacturing Group, Storm Lake, IA (US)

( * ) Notice: Subject to any disclaimer, the term of this patent is extended or adjusted under 35 U.S.C. 154(b) by 0 days.

(21) Appl. No.: 13/106,168

(22) Filed: May 12, 2011

(51) Int. Cl.
*B65G 15/08* (2006.01)
*B65G 15/40* (2006.01)
*B65G 15/42* (2006.01)

(52) U.S. Cl. ...... 198/819; 198/820; 198/716; 198/699.1

(58) Field of Classification Search ............... 198/818, 198/819, 820, 821, 822, 847, 699.1, 808, 198/823, 716, 717, 749, 748, 725
See application file for complete search history.

(56) References Cited

U.S. PATENT DOCUMENTS

| | | | |
|---|---|---|---|
| 855,745 A * | 6/1907 | Argall ........................... 414/302 |
| 874,982 A * | 12/1907 | Norton ....................... 198/690.2 |
| 2,864,488 A * | 12/1958 | Taipale ........................... 198/821 |
| 3,326,354 A | 6/1967 | Aydelott |
| 3,429,422 A * | 2/1969 | Yoshimura ................. 198/699.1 |
| 3,715,840 A * | 2/1973 | Davidson ....................... 451/326 |
| 5,351,810 A * | 10/1994 | Tingskog ....................... 198/819 |
| 5,511,652 A | 4/1996 | McGinnis |
| 6,170,646 B1 | 1/2001 | Kaeb et al. |
| 6,405,855 B1 * | 6/2002 | Peltier et al. .................. 198/819 |
| 6,675,958 B2 | 1/2004 | Kaeb et al. |
| 8,020,706 B2 * | 9/2011 | Hendrickson et al. ........ 209/707 |
| 2002/0175055 A1 * | 11/2002 | Ryde ............................. 198/847 |
| 2010/0326798 A1 | 12/2010 | Friesen |

* cited by examiner

*Primary Examiner* — Gene Crawford
*Assistant Examiner* — Keith R Campbell
(74) *Attorney, Agent, or Firm* — McKee, Voorhees & Sease, P.L.C.

(57) ABSTRACT

An improved conveyor belt is provided for use in a tubular conveyor. The belt includes a plurality of cleat sets extending at a non-perpendicular angle across the axis of the belt. Adjacent cleat sets are offset with respect to one another, such that the axis of adjacent cleat sets are non-parallel. Each cleat set includes a plurality of spaced apart, upstanding cleat members. The orientation of the cleat sets helps maintain material toward the center of the belt, while the orientation of the cleat members eliminates vacuum behind the cleat members.

16 Claims, 7 Drawing Sheets

CROSS CLEATED CONVEYOR BELT FOR A TUBULAR CONVEYOR

BACKGROUND OF THE INVENTION

Cleated conveyor belts are well-known for use in transporting materials such as grain, seeds, and other dry or particulate material. The conveyor belt extends around a pair of spaced apart pulleys and is rotated to transport the material from an inlet adjacent one end of the belt to an outlet at the opposite end of the belt. Often, the conveyor system is inclined, such that gravity and operational vibrations causes the material to slide down the belt while being carried upwardly. The cleats, which normally extend across the belt in an arrangement perpendicular to the longitudinal axis of the belt, help minimize undesirable product migration or slide.

It is also well-known to use cleated belts in a tubular conveyor, which precludes or minimizes loss of material from blowing air, particularly in inclined applications. However, since the belt must curve across its width to pass through the tubular conduit or channel, the cleats must be segmented to accommodate the change in belt shape from a flat configuration adjacent the pulleys to a curved configuration of the tubular channel.

Also, with prior art conveyors having cleats perpendicular to the conveyor axis, there tends to be a vacuum formed behind the cleat at the discharge end of the conveyor. This vacuum causes material to be sucked into the belt guard, and thus not discharged as desired at the outlet end of the belt.

Accordingly, a primary objective of the present invention is the provision of an improved cleated conveyor belt for use in tubular conveyor assemblies.

Another objective of the present invention is the provision of a conveyor system having a cross cleated conveyor belt.

A further objective of the present invention is the provision of a conveyor belt having a plurality of cleat sets arranged on the belt with non-parallel axes.

Still another objective of the present invention is the provision of a cross cleated conveyor belt with multiple sets of cleats, with each set including a plurality of spaced cleat members.

A further objective of the present invention is the provision of an improved conveyor belt for use in a tubular conveyor wherein the cleat arrangement and configuration eliminates or minimizes any vacuum behind the cleats at the discharge end of the conveyor.

Yet another objective of the present invention is a conveyor belt having a plurality of sets of cleats, with each set crossing the longitudinal axis of the belt at a non-perpendicular angle.

Another objective of the present invention is the provision of an improved conveyor belt with cleats which is economical to manufacture and safe and durable in use.

These and other objectives will become apparent from the following description of the invention.

SUMMARY OF THE INVENTION

The conveyor assembly of the present invention includes a pair of spaced apart pulleys with a tubular channel or conduit extending between the pulleys. An endless loop belt is trained about the pulleys for rotation about the pulleys. The belt extends through the tubular channel. The belt is substantially flat when passing around the pulleys and curved substantially in accordance with the lower wall of the tubular channel when passing through the channel.

The belt includes a plurality of cleat sets, with each set having a longitudinal axis which is non-perpendicular to the longitudinal axis of the belt. The cleat sets are alternatingly offset with respect to one another, such that the axes of adjacent sets are non-parallel to one another. Each cleat set includes a plurality of cleat members which are also oriented in a non-perpendicular relation to the belt axis.

DETAILED DESCRIPTION OF THE PREFERRED EMBODIMENTS

Figure 1:
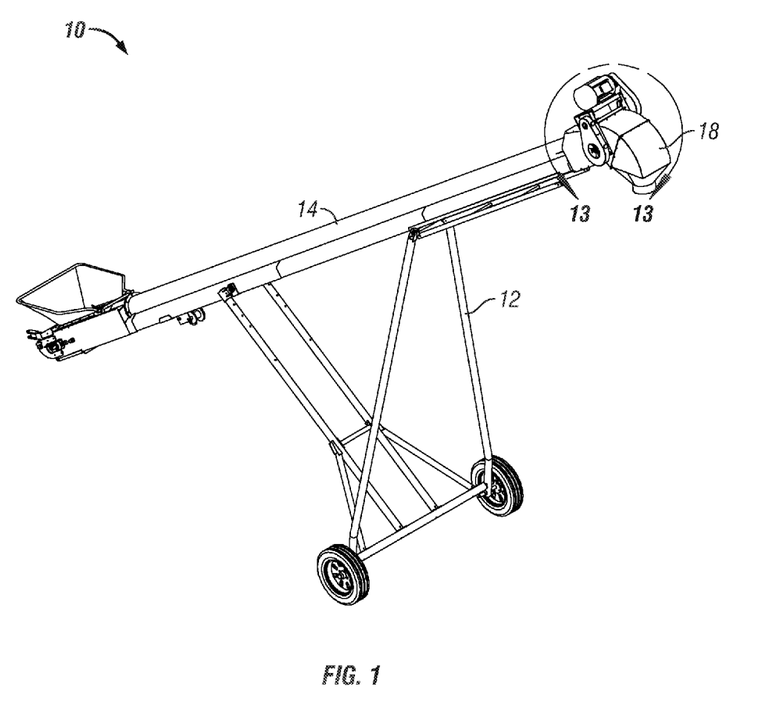
FIG. 1 is a perspective view of a conveyor according to the present invention.
Figure 2:
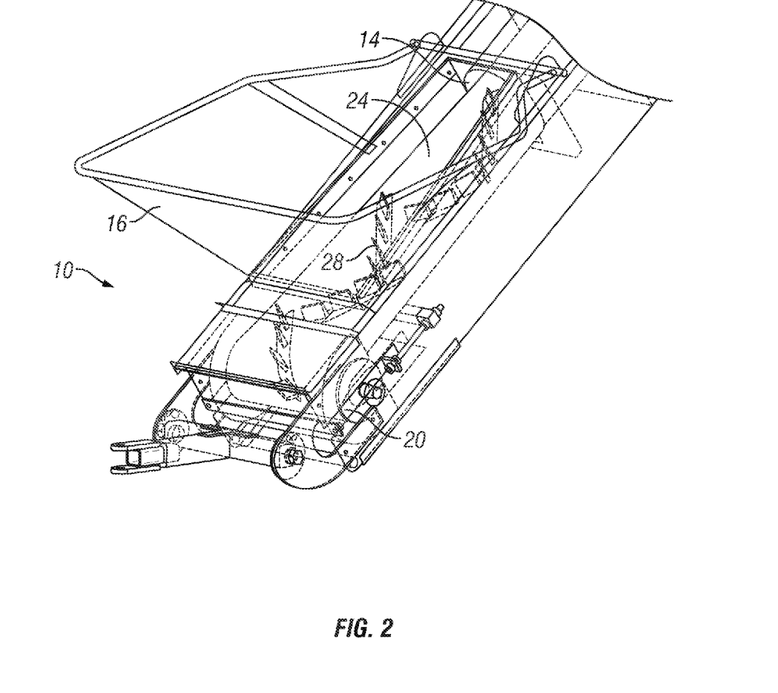
FIG. 2 is a perspective view of the inlet end of the conveyor.
Figure 3:
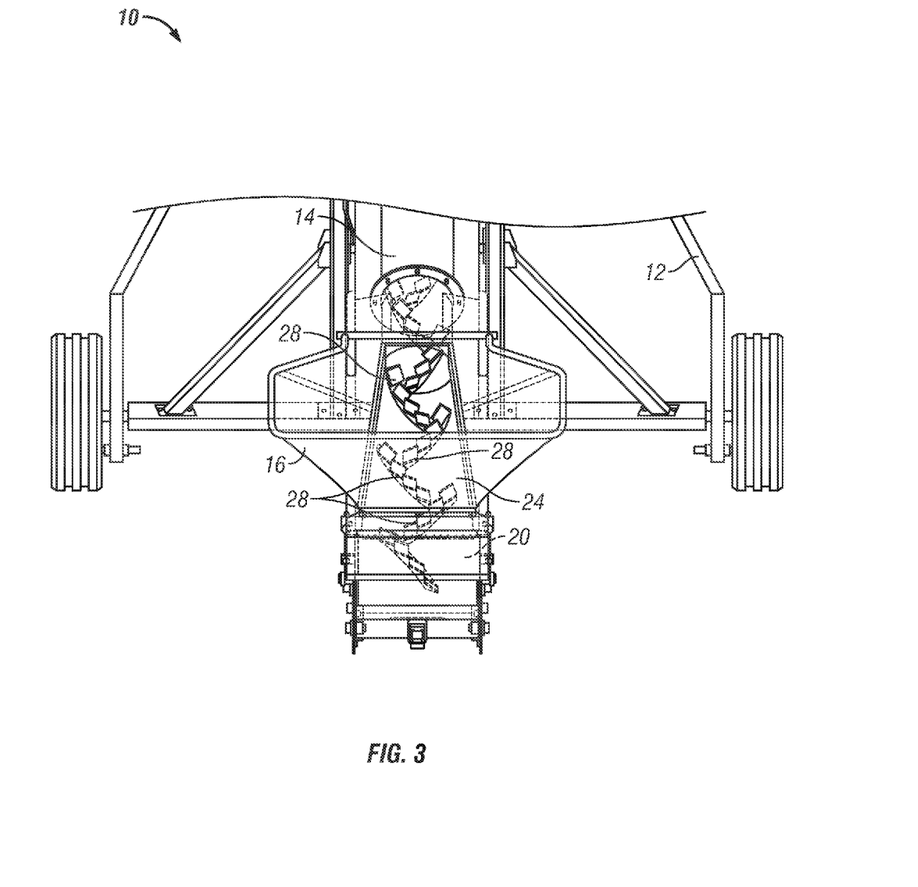
FIG. 3 is an elevation view of the inlet end of the conveyor.
Figure 4:
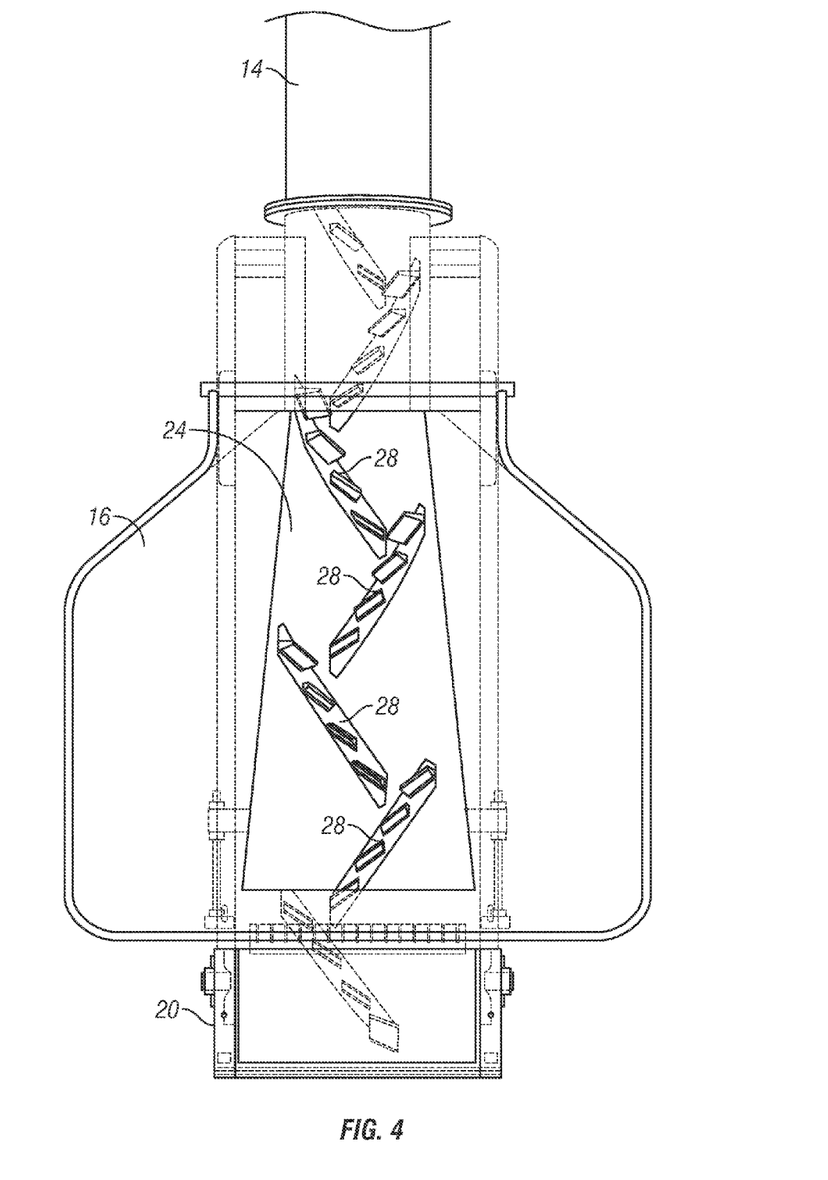
FIG. 4 is a top plan view of the inlet end of the conveyor.
Figure 5:
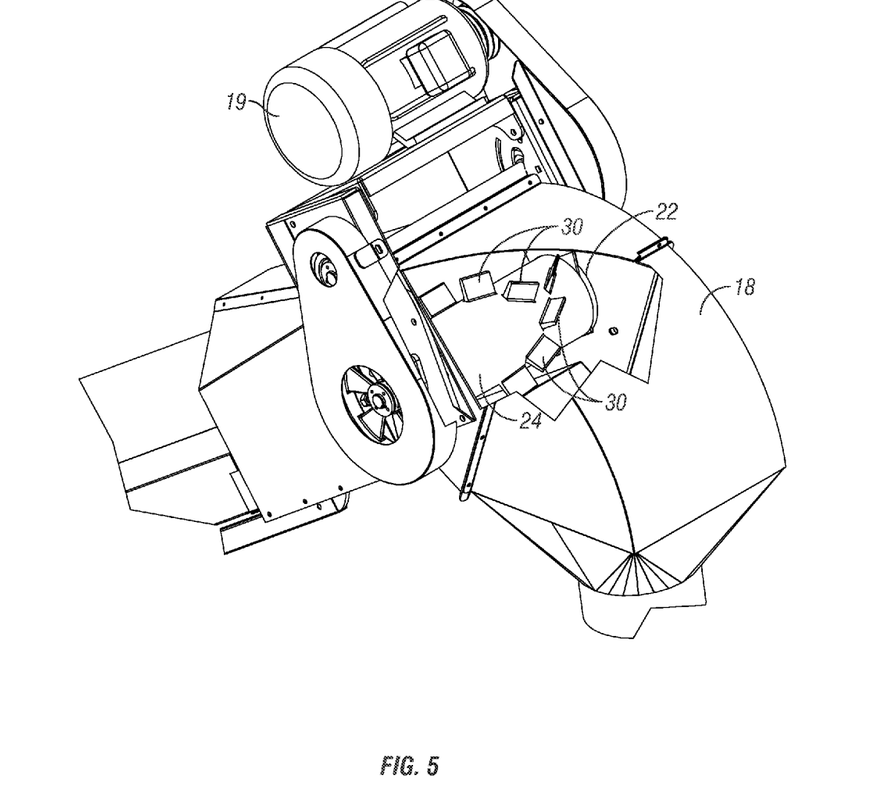
FIG. 5 is a perspective view of the outlet end of the conveyor with a portion of the housing broken away to show the cleated belt according to the present invention.

A tubular style conveyor according to the present invention is generally designated by the reference numeral 10 in the drawings. The conveyor 10 includes a wheeled frame 12 for supporting a tubular conduit or channel 14 at various angles. The frame 12 is adjustable, in manners known in the art, so that the inclination of the tube 14 can be set as desired. The conveyor 10 includes an inlet hopper 16 and an outlet discharge chute 18 at opposite ends. Pulleys 20, 22 are rotatably mounted at the opposite ends of the conveyor 10 adjacent the inlet hopper 16 and the discharge chute 18, respectively. Preferably, one of the pulleys 20, 22 is driven and the other pulley is an idler. As seen in FIG. 5, in a preferred embodiment, a motor 19 drives the pulley 22. The components 12-22 of the conveyor 10 may have various dimensions and construction, without departing from the scope of the invention.

Figure 6:
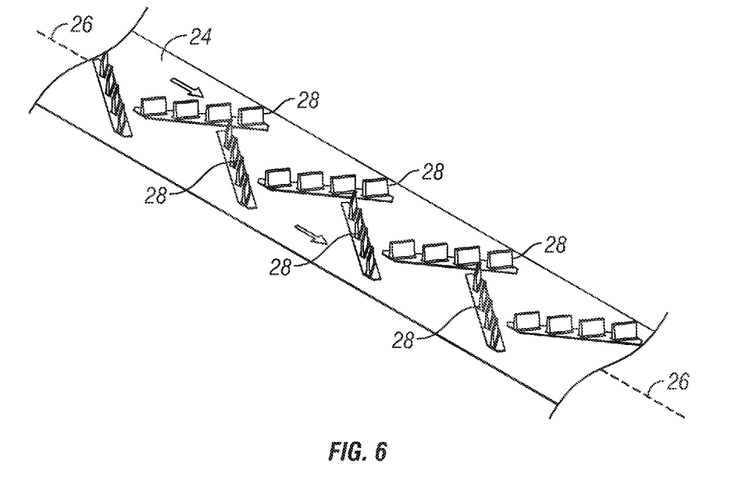
FIG. 6 is a perspective view of the cleated belt in a flat condition.
Figure 7:
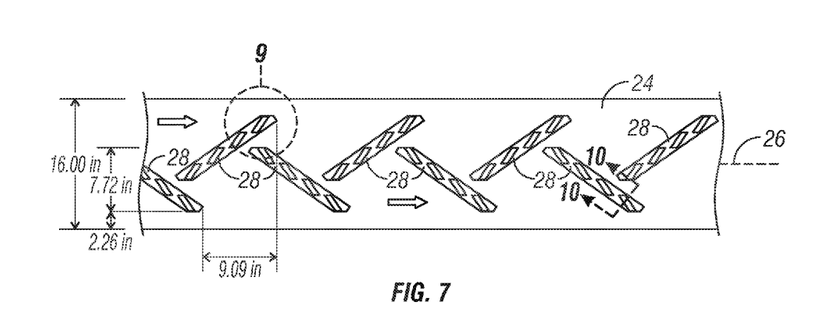
FIG. 7 is a plan view of the cleated belt in a flat condition.
Figure 8:
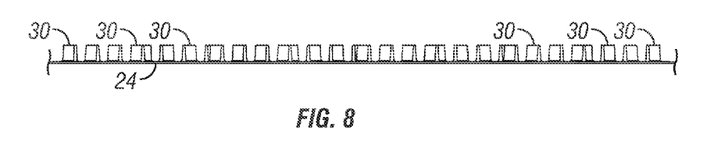
FIG. 8 is a side elevation view of the cleated belt in a flat condition.

The conveyor 10 also includes an elongated endless loop belt 24 trained about the pulleys 20, 22 for rotation with the pulleys. The belt 24 has a constant width and a central, longitudinal axis 26. The belt 24 also has a plurality of cleat sets 28 on the outer surface of the belt and which are staggered along the full length of the belt 24. Each of the cleat sets 28 has a longitudinal axis which is non-perpendicular to the belt axis 26. In a preferred embodiment, the cleat sets 28 are set at an angle of approximately 35° relative to the opposite edges of the belt. The longitudinal axis of the cleat sets 28 can be varied without departing from the scope of the invention.

Adjacent cleat sets 28 are angularly offset with respect to one another, such that the axis of one cleat set is non-parallel to the axis of an adjacent cleat set. Each cleat set 28 has forward and rearward ends, and each cleat set 28 crosses the belt axis in a non-perpendicular angle. Thus, the front end of one cleat set is on the same side of the belt axis 26 as the rear end of an adjacent cleat set. The front end of each cleat set is defined as the end closest to the outlet pulley 22, while the rear end of each cleat set is defined as the end closest to the inlet pulley 20.

Figure 9:
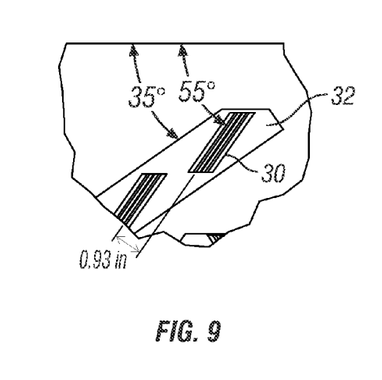
FIG. 9 is an enlarged view taken along lines 9-9 of FIG. 7.
Figure 10:
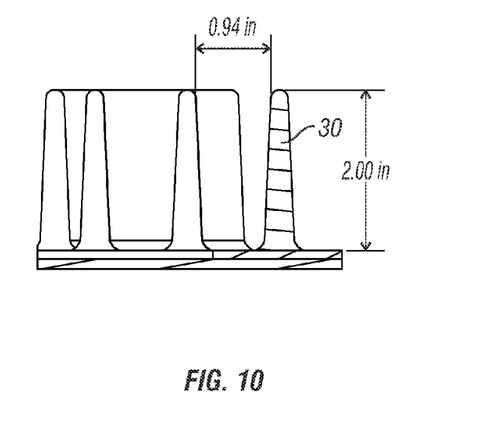
FIG. 10 is a sectional view taken along lines 10-10 of FIG. 7.
Figure 11:
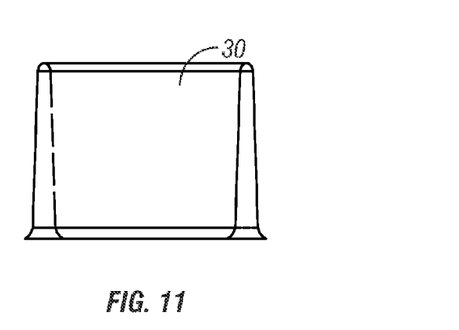
FIG. 11 is a front elevation view of one of the cleat members of the cleated belt.
Figure 12:
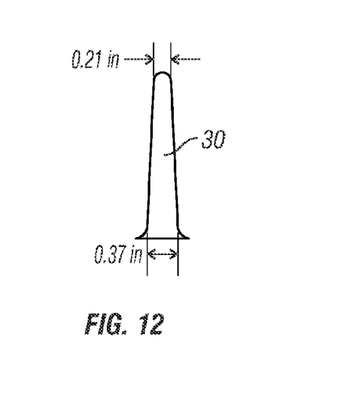
FIG. 12 is an end view of one of the cleat members.
Figure 13:
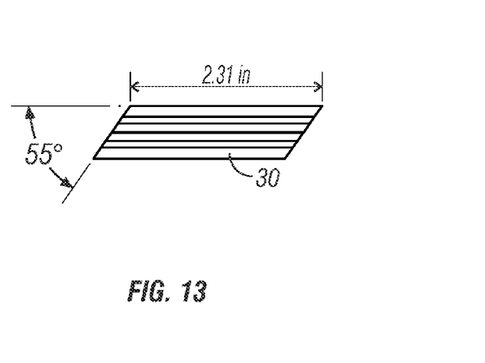
FIG. 13 is a top plan view of one of the cleat members.

Each cleat set includes a plurality of upstanding cleat members 30. Each cleat member 30 may be independently secured to the outer surface of the belt 24, or alternatively, the cleat members 30 in each cleat set 28 can be interconnected with a base 32 which in turn is mounted on the outer surface of the belt 24. The mounting of the cleat sets 28 and cleat members 30 on the belt 24 is by any convenient means. The cleat members 30 in each cleat set 28 are spaced apart and have parallel longitudinal axes. As seen in FIG. 9, the longitudinal axis of the individual cleat members 30 is offset with respect to the longitudinal axis of the cleat sets 28. In a preferred embodiment, the cleat members are oriented at approximately 55° relative to a side edge of the belt 24. It is understood that this angle may be varied without departing from the scope of the invention. The dimensions of the cleat members 30 may be the same or different from one another, and may vary depending on the width of the belt 24. Also, the spacing between the cleat members 30 may be equal or non-equal.

In use, the belt 24 is substantially flat across its width as it passes around each pulley 20, 22. As the belt 24 enters the downstream end of the tube 14, the belt 24 curves across its width to a radius substantially similar to the curvature of the tube 14. As the belt 24 exits the tube 14, the belt 24 flattens out for passage around the outlet pulley 22. As seen in FIG. 5, the angular orientation of the cleat sets 28 and the separate configuration of the cleat members 30 in each cleat set 28 allows the cleat members 30 to sequentially pass around each pulley 20, 22 without undue stress or detrimental force.

The alternating angular orientation of the adjacent cleat sets tends to maintain the material or product on the belt 24 toward the center of the belt 24. The angle and distance between the cleat sets 28 results in less drag adjacent the outlet pulley 22 as material passes over the pulley 22. Also, the angular orientation of the cleat sets 28 eliminates or minimizes any vacuum forming behind the cleat members 30, and thus avoids material being sucked into the belt guard. The cleat sets 28 also extend substantially across the width of the belt 24, thereby decreasing or minimizing material rollback down the belt 24 as the belt 24 is moving through the inclined tube 14.

The overall structure and orientation of the cleat sets 28 and cleat members 30 produce more efficient, gentler and faster transportation of the material by the conveyor 10. Thus, the improved cleated belt of the present invention yields time and energy savings.

Even when the conveyor 10 is inclined at relatively steep angles, the cleat sets 28 minimize or eliminate downward product slide or tumble, thereby reducing product damage during conveyance. The stepper incline of the conveyor 10 which is possible with the cleated belt 24 also reduces the footprint of the conveyor.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved conveyor belt for use in a tubular conveyor, comprising:
   an endless loop belt having an outer surface, opposite left and right edges, and a longitudinal axis;
   a first set of cleats on the belt extending across the longitudinal axis at a non-perpendicular angle from left to right;
   a second set of cleats on the belt extending across the longitudinal axis at a non-perpendicular angle from right to left;
   each set of cleats including, a plurality of upstanding cleat members; and
   each set of cleats having a longitudinal axis and each cleat member having a longitudinal axis, with the axes of cleat members in a set being offset from the longitudinal axis of the set.

2. The improved conveyor belt of claim 1 wherein each of the first and second sets of cleats have forward and rearward ends, with the forward ends being on opposite sides of the belt axis and the rearward ends being on opposite sides of the belt axis.

3. The improved conveyor belt of claim 1 wherein each of the first and second sets of cleats have forward and rearward ends, with the rearward end of the first set and the forward end of the second set being on the same side of the longitudinal axis.

4. The improved conveyor belt of claim 1 further comprising a plurality of the first and second sets of cleats alternatingly arranged on the belt.

5. The improved conveyor belt of claim 1 wherein each cleat member has a primary horizontal axis which is non-perpendicular to the longitudinal axis of the belt.

6. The improved conveyor belt of claim 1 wherein the cleat members in each set are mounted on a base.

7. The improved conveyor belt of claim 1 wherein the cleat members in each set are interconnected.

8. The improved conveyor belt of claim 1 wherein each cleat member has a longitudinal axis extending approximately 55° relative to the belt's longitudinal axis.

9. The improved conveyor belt of claim 1 wherein each cleat set has a longitudinal axis extending approximately 35° relative to the belt's longitudinal axis.

10. A conveyor assembly, comprising:
    a pair of spaced apart pulleys;
    a tubular channel between the pulleys;
    an endless loop belt trained about the pulleys for rotation about the pulleys and the belt having a longitudinal axis;
    the belt being substantially flat from side to side while passing over the pulleys and being curved from side to side while passing through the channel;
    a plurality of alternating first and second cleat sets;
    the first and second cleat sets having non-parallel longitudinal axes;
    each cleat set including a plurality of upstanding cleat members; and
    each set having a longitudinal axis extending approximately 35° from the belt's longitudinal axis and each cleat member having a longitudinal axis extending approximately 55° relative to the belt's longitudinal axis.

11. The conveyor assembly of claim 10 wherein the longitudinal axes of the cleat sets are non-perpendicular to the belt longitudinal axis.

12. The conveyor assembly of claim 10 wherein the first and second cleat sets each have forward and rearward ends on opposite sides of the belt axis.

13. The conveyor assembly of claim 10 wherein each cleat set has a forward end and a rearward end, with the forward end of each cleat set extends forwardly beyond the rearward end of each adjacent cleat set.

14. The conveyor assembly of claim 10 wherein each cleat set has forward and rearward ends residing on opposite sides of the belt axis.

15. The conveyor assembly of claim 10 wherein each cleat member has a primary horizontal axis which is non-perpendicular to the longitudinal axis of the belt.

16. The conveyor assembly of claim 10 wherein the cleat members in each set are interconnected.

* * * * *